Dec. 18, 1956  J. L. PRESLER  2,774,456
DUMP CHUTE FOR WAGONS

Filed Dec. 28, 1951.  2 Sheets-Sheet 1

INVENTOR.
BY JAMES LAWRENCE PRESLER,

ATTORNEYS.

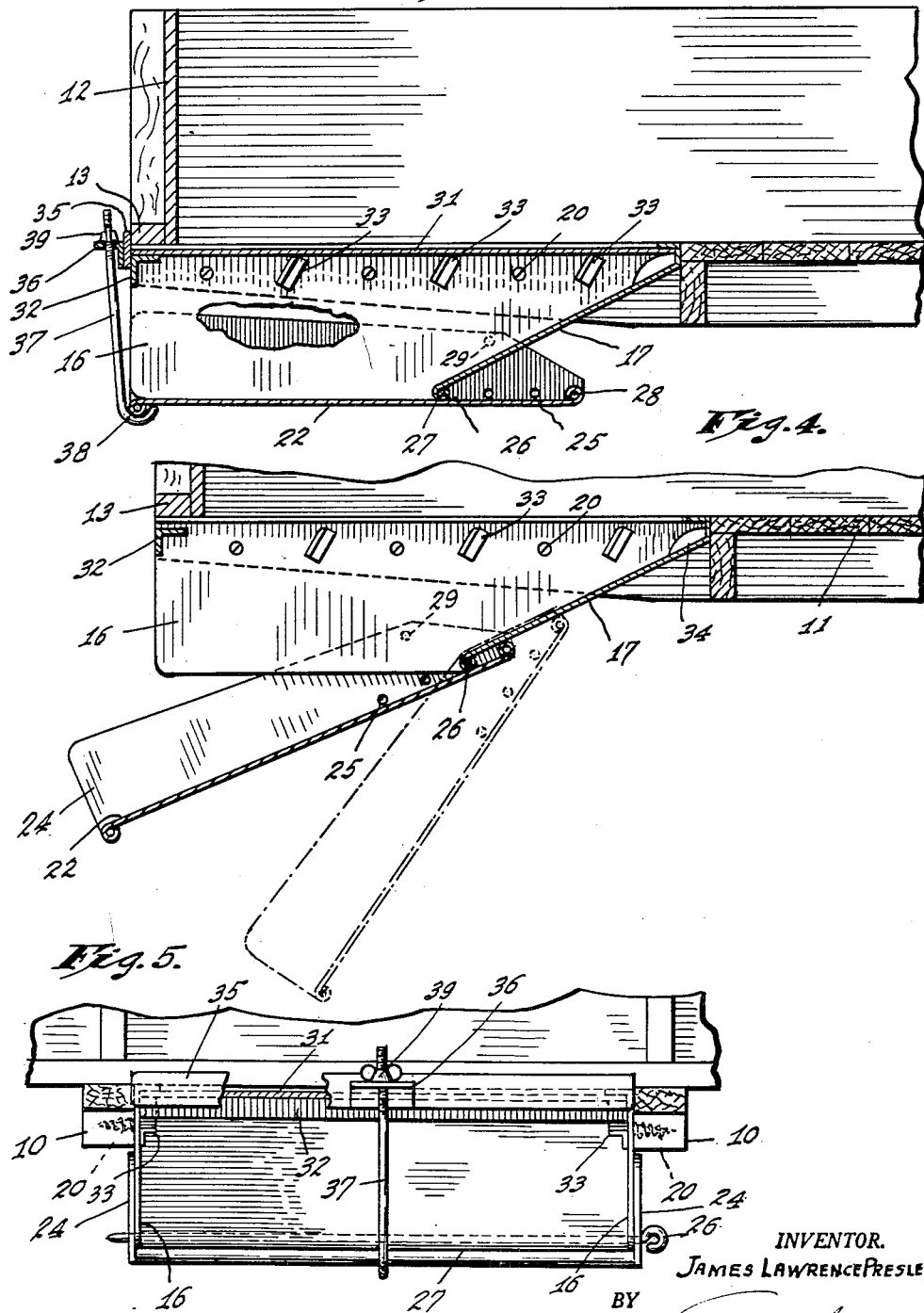

United States Patent Office 2,774,456
Patented Dec. 18, 1956

2,774,456

DUMP CHUTE FOR WAGONS

James Lawrence Presler, Van Wert, Ohio

Application December 28, 1951, Serial No. 263,917

7 Claims. (Cl. 193—4)

This invention relates to a dump-chute structure for incorporation in a wagon or similar vehicle. Among the objects of the invention are to produce a structure which can be incorporated in the vehicle by the manufacturer or applied to a vehicle already built; to produce a structure which will not interfere with normal uses of the vehicle; to produce a structure embodying a chute which is adjustable to vary its inclination and the extent to which it projects beyond the vehicle-body; and to provide for the structure a gate or closure having an associated guide means which will not tend to clog.

In carrying out the invention in its preferred form, I employ a hopper or body having spaced parallel side walls and an inclined rear wall, the body being open at its top, at its front end, and at its bottom, such body being adapted to be set into the floor of a wagon or like vehicle with its open top flush with such floor. Associated with the body I provide a chute having a bottom wall and side walls, the latter overlapping the side walls of the body. A pivot pin located near the lower edge of the rear wall of the body serves as a pivotal interconnection between the chute and body, the rear end of the bottom wall of the chute engaging the inclined rear wall of the body to limit the extent to which the chute can swing downwardly about the pivot member. The chute is arranged to receive the pivot member at different locations whereby to vary the extent to which the chute projects from the body and the extent to which the chute can swing downwardly from the body. The open upper end of the body is closed by a slidable gate supported on spaced guide members, and means are provided for jointly holding the chute in retracted position and the gate in closed position.

Figure 1:
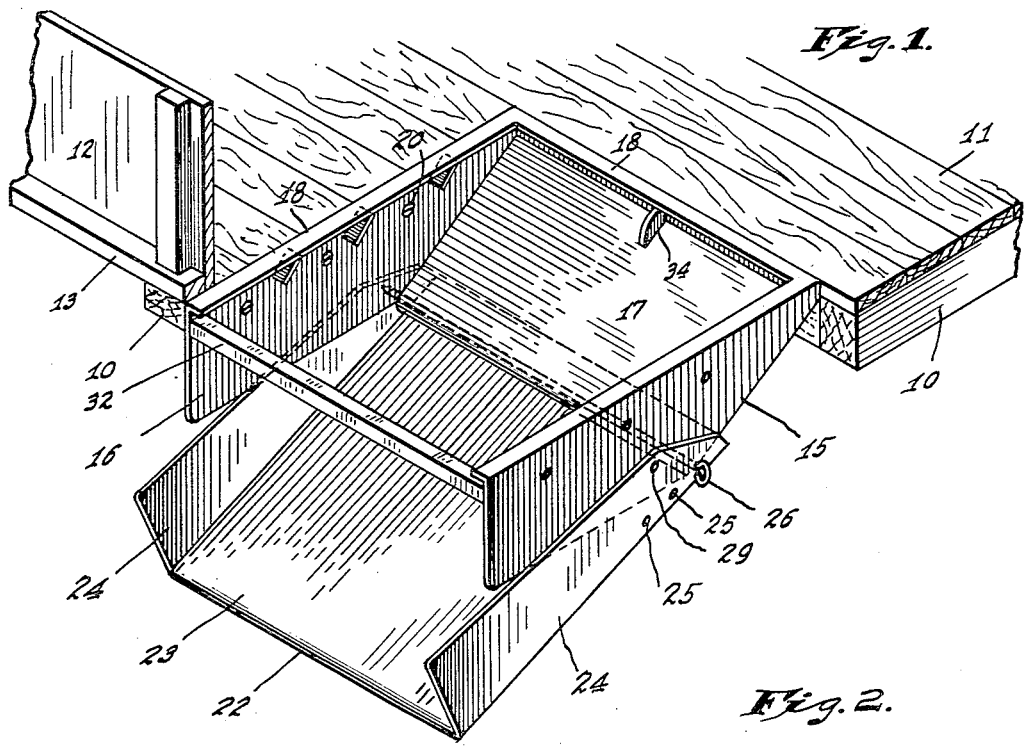
Figure 2:
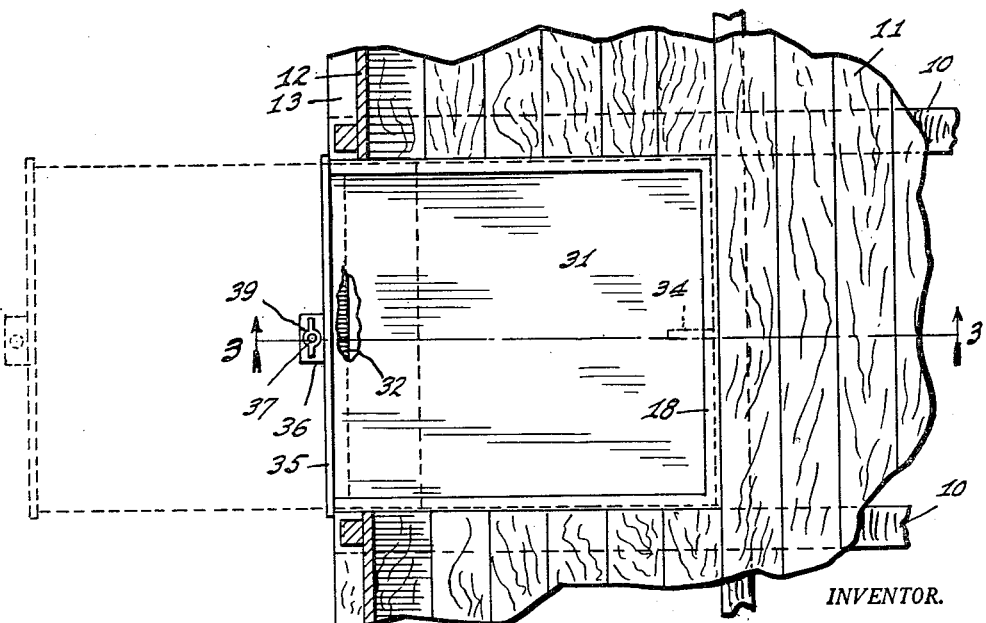

The accompanying drawings illustrate the invention: Fig. 1 is a fragmental isometric view of a wagon with portions of the bed and one side broken away to illustrate the discharge structure; Fig. 2 is a fragmental plan view of the wagon with the discharge structure in place; Fig. 3 is a vertical section on the line 3—3 of Fig. 2 showing the chute in retracted position; Fig. 4 is a view similar to Fig. 3 showing the chute in extended position; and Fig. 5 is a fragmental side elevation of the wagon showing the chute retracted.

In the drawing, I have illustrated a wagon the bed of which comprises transversely extending cross-members 10 and a floor 11 supported on such cross-members. Extending around the edge of the floor 11 are sides 12 including side rails 13 resting on the outer ends of the cross-members 10.

The discharge-chute structure embodying my invention has a body 15 which is generally rectangular in plan and which has parallel side walls 16 and an inclined inner or rear wall 17. The upper edges of the walls 16 and 17 are bent inwardly to provide coplanar horizontal flanges 18. The body 15 is set into the floor of the wagon with the upper surfaces of the flanges 18 flush with the upper surface of the floor and with the outer ends of the side wall 16 approximately flush with a marginal edge of the floor. If the discharge-chute structure is incorporated in the wagon as manufactured, two adjacent cross-members 10 of the wagon may be spaced apart the proper distance to receive the body 15 snugly between them, and the floor 11 may be formed to leave an opening for the body. If the structure is to be applied to a wagon already manufactured, the floor is cut away to provide an opening for reception of the body 15; and if the adjacent cross-members 10 are not properly spaced to receive the body snugly between them, an extra cross member 10 may be installed. To secure the body in place, the side walls 16 may be provided with openings for the reception of screws 20 which extend through the side walls into the adjacent cross members 10.

The discharge chute, which is designated in its entirety by the reference numeral 22, has a bottom wall 23 and side walls 24 spaced apart a distance sufficient to receive the side walls 16 of the body between them. Near the rear end of the chute, the side walls 24 are provided with rows of aligned openings 25 for the reception of a pivot bolt or pin 26 through the medium of which the chute is pivotally connected to the body 15. As shown, the lower edge of the rear body-wall 17 is rolled to provide a bead 27 through which the pivot member 26 extends, but other means may be employed for mounting the pivot member if desired. The rear edge of the bottom chute-wall 23 may be rolled to provide a bead 28 which, as indicated in Fig. 4, engages the rear body wall 17 to limit downward swinging of the chute 22 about the axis of the pivot member 26.

As will be clear from Fig. 4, which shows the chute in extended position, the extent to which the chute projects laterally from the wagon will depend upon which pair of holes 25 in the chuteside-walls receive the pivot member 26. As illustrated, the pivot member is in the inner pair of holes; and the chute 22 therefore projects to its maximum extent from the body. By placing the pivot member 26 through the outermost pair of holes 25, the chute will be displaced inwardly of the wagon, so that the outer end of the chute will not project beyond the outer ends of the side walls 16 when the chute is in its retracted position illustrated in Fig. 3. Intermediate pairs of openings 25 permit intermediate degrees of chute-extension. Desirably, the bead 28 or other abutment which limits downward swinging of the chute is so formed that when the chute is in its extended position the rows of holes 25 will be parallel to the inclined rear wall 17 of the body, so that the inclination of the chute will not change when its extension is varied.

In addition to the holes 25, the chute side-walls may be provided with one or more additional pairs of aligned holes 29 located above the holes 25. When the holes 29 are used for reception of the pivot member, the extent to which the chute swings downwardly when extended can be increased, as indicated by the chain-line showing in Fig. 4.

To close the open upper face of the body 15, I provide a gate 31 in the form of a flat metal plate. Such plate is received immediately beneath the flanges 18, where its outer end is supported on a cross-member 32 extending between and secured to the outer ends of the side walls 16. The sides of the gate are supported on spaced lugs 33 secured to the inner surfaces of the side walls 16, and its inner end is supported on one or more lugs 34 secured to the rear wall 17. The outer faces of the lugs 33 and 34 are inclined inwardly and upwardly to facilitate insertion of the gate.

Extending across and secured to the outer end of the gate is a reinforcing and stop member 35, the upper portion of which overlaps the side rail 13 of the wagon and the lower portion of which overlaps the cross-member 32. Secured to the outer face of the stop member 35 is an angle bracket 36 having an opening for the reception of a hook bolt 37 provided with a head engaging beneath the outer edge of the bottom chute-wall 23, which may be provided for the purpose with a rolled bead 38. A wing nut 39 on the threaded end of the hook bolt 37 above the bracket 36 may be tightened to draw the outer end of the chute upwardly.

When the wagon is being used for its ordinary purposes, the gate 31 is in place and the chute 22 occupies the retracted position illustrated in Fig. 3. The hook bolt 37 serves both to draw the outer end of the chute upwardly to the limit permitted by engagement of the outer walls 16 of the body with the bottom wall 23 of the chute and also to retain the gate 31 in closed position, where it is supported on the cross-member 32 and the lugs 33 and 34. When it is desired to empty the wagon, the hook bolt 37 is loosened and the chute 22 permitted to drop downwardly, its downward movement being limited by engagement of the bead 28 with the rear wall 17 of the body. As above described, the extent to which the chute projects beyond the side of the wagon bed may be varied by proper selection of the holes 25 through which the pivot member 26 extends; and if a relatively large inclination of the chute is desired, the pivot member may be placed in the auxiliary holes 29. With the chute in extended position and the gate 31 removed, that portion of the contents of the wagon lying above and adjacent the body will discharge by gravity through the chute, and the balance of the contents of the wagon can readily be shoveled into the body to flow downwardly through the chute. The possibility of chute-adjustment provided by the holes 25 and 29 greatly facilitates the accurate positioning of the chute such as is necessary to permit it to discharge into the hopper of a farm elevator. When the chute is retracted, it does not project beyond the lateral limits of the wagon and hence does not interfere with the maneuvering thereof.

The lugs 33 and 34 upon which the gate rests when closed provide an adequate support for the cover. At the same time, their gate-engaging upper surfaces are of such limited extent that they will not support any accumulation of grain or other material which might interfere with sliding of the gate into its closed position.

I claim as my invention:

1. A discharge-chute structure for incorporation in a wagon or like vehicle, comprising a body open at its top and having opposed side walls projecting downwardly from such top, a chute having a bottom wall and side walls overlapping those of the body, a pivot member, said chute side-walls having pairs of aligned openings arranged in rows generally parallel to said bottom wall for selective positioning of said chute in desired projecting relation laterally of said body and in desired angular relation to said body, each pair of said aligned openings being adapted to receive said pivot member, and means on said body for supporting said pivot member in fixed position adjacent the bottom of said body.

2. A discharge-chute structure for incorporation in a wagon or like vehicle, comprising a body open at its top and having opposed side walls projecting downwardly from such top, a chute having a bottom wall and side walls overlapping those of the body, a pivot member, said chute side-walls having pairs of aligned openings arranged at different distances from said bottom wall for selective positioning of said chute in desired projecting relation laterally of said body and in desired angular relation to said body, each pair of said aligned openings being adapted to receive said pivot member, and means on said body for supporting said pivot member in fixed position adjacent the bottom of said body.

3. A discharge-chute structure for mounting in the floor of a wagon or like vehicle, comprising a body open at its top and having an inner end and an outer end, said body having opposed side walls adapted to project downwardly below the floor of a vehicle when the body is attached to such floor with its top substantially flush with the upper surface thereof, a chute having a bottom wall and side walls overlapping those of the body, said body having an inner wall which extends between the body side walls and slopes downwardly and outwardly, and pivot means at the outer end of said inner wall supporting the chute for swinging movement about a horizontal, transverse axis, the bottom wall of the chute projecting inwardly beyond said pivot means to engage the inner body-wall and thereby limit downward swinging of the outer end of the chute, said pivot means being connected to the chute at a point displaced inwardly from the center of gravity of the chute whereby the outer end of the chute will tend to drop downwardly, a removable gate for the open top of the body, and common means for holding the outer chute-end elevated and the gate in closed position.

4. A discharge-chute structure for mounting at the edge of the floor of a wagon or like vehicle, comprising a generally rectangular body having an open top, said body having at its top an inwardly projecting flange extending along the sides and across the inner end of the body, said body being provided beneath said flange with a series of horizontally spaced gate-supports distributed along the sides and inner end of said body beneath said flange, and a gate supported on said supports for horizontal sliding movement into and out of the open top of the body.

5. The invention set forth in claim 4 with the addition that said supports have faces which are presented toward the outer end of the body and which slope outwardly and downwardly.

6. A discharge-chute structure for mounting in the floor of a wagon or like vehicle, comprising a body open at its top and having an inner end and an outer end, said body having opposed side walls adapted to project downwardly below the floor of a vehicle when the body is attached to such floor with its top substantially flush with the upper surface thereof, a chute having a bottom wall and side walls overlapping those of the body, said body having an inner wall which extends between the body side walls and slopes downwardly and outwardly, and pivot means supporting the chute for swinging movement about a horizontal, transverse axis, said pivot means being connected to the chute at a point displaced inwardly from the center of gravity of the chute whereby the outer end of the chute will tend to drop downwardly, a removable gate for the open top of the body, and common means for holding the outer chute-end elevated and the gate in closed position.

7. The invention set forth in claim 6 with the addition that said common means includes screw-threaded means operable to force the outer chute-end upwardly.

References Cited in the file of this patent

UNITED STATES PATENTS

| | | |
|---|---|---|
| 121,737 | Valentine | Dec. 12, 1871 |
| 173,629 | High et al. | Feb. 15, 1876 |
| 777,084 | Dwyer | Dec. 13, 1904 |
| 863,858 | Ledoux | Aug. 20, 1907 |
| 1,119,475 | Tingley et al. | Dec. 1, 1914 |
| 2,146,676 | Lawson | Feb. 7, 1939 |
| 2,149,867 | Pierson | Mar. 7, 1939 |
| 2,576,154 | Trautvetter | Nov. 27, 1951 |